US012262201B1

(12) United States Patent
Ganesan

(10) Patent No.: US 12,262,201 B1
(45) Date of Patent: Mar. 25, 2025

(54) SYSTEMS AND METHODS FOR A CONNECTED MOBILE APPLICATION WITH AN AR-VR HEADSET

(71) Applicant: Wells Fargo Bank, N.A., San Francisco, CA (US)

(72) Inventor: Sundara Murthy Ganesan, Chennai (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 267 days.

(21) Appl. No.: 17/946,827

(22) Filed: Sep. 16, 2022

(51) Int. Cl.
*H04W 12/06* (2021.01)
*G06F 3/01* (2006.01)
*G06F 3/16* (2006.01)
*G06T 19/00* (2011.01)

(52) U.S. Cl.
CPC .......... *H04W 12/068* (2021.01); *G06F 3/017* (2013.01); *G06F 3/167* (2013.01); *G06T 19/006* (2013.01)

(58) Field of Classification Search
CPC . H04W 12/009; H04W 12/06; H04W 12/068; H04W 12/30; H04W 12/33; H04W 12/65; H04W 12/68; H04W 12/69; H04W 4/021; H04W 1/72409; H04W 1/72412; G06F 3/017; G06F 3/167; G06T 2201/00
See application file for complete search history.

(56) References Cited

U.S. PATENT DOCUMENTS

| | | | |
|---|---|---|---|
| 9,275,213 | B2 | 3/2016 | Kundu et al. |
| 9,792,594 | B1 | 10/2017 | Bayha et al. |
| 10,049,500 | B2 | 8/2018 | Morrison |
| 10,078,867 | B1 | 9/2018 | Chan et al. |
| 10,235,810 | B2 | 3/2019 | Morrison |
| 10,299,118 | B1 | 5/2019 | Karachiwala et al. |
| 10,332,103 | B2 | 6/2019 | Carpenter et al. |
| 10,462,425 | B1 | 10/2019 | Carroll et al. |

(Continued)

FOREIGN PATENT DOCUMENTS

WO    WO-2018/204822 A1    11/2018

OTHER PUBLICATIONS

ISM. "Financial Services Industry VR/AR/XR Use Cases", 2022 ISMGuide.com,https://ismguide.com/integrated-strategies-3/vr-financial-services/.

(Continued)

*Primary Examiner* — Quochien B Vuong
(74) *Attorney, Agent, or Firm* — Foley & Lardner LLP

(57) ABSTRACT

Systems and methods of enabling a client account transaction via a client account application on a mobile device via an augmented reality or virtual reality device are provided. A computer-implemented method includes establishing a wireless connection between the devices and authenticating a user. Authenticating the user includes receiving a prompt for authentication information from the mobile device, detecting a selection of authentication information, transmitting the authentication information to the mobile device, and receiving a notification from the mobile device that the authentication information was verified. The method further includes receiving display data comprising one or more input fields associated with the client account application; displaying a visual environment based on the display data; detecting a selection of an input field; and causing execution of the selection by transmitting the selection to the mobile device.

20 Claims, 4 Drawing Sheets

(56) References Cited

U.S. PATENT DOCUMENTS

| | | | |
|---|---|---|---|
| 10,510,054 B1 | 12/2019 | Eidam et al. | |
| 10,535,202 B2* | 1/2020 | Schmirler | G06F 3/147 |
| 10,586,220 B2 | 3/2020 | Adams et al. | |
| 10,623,959 B1 | 4/2020 | Young et al. | |
| 10,706,136 B2 | 7/2020 | Cash | |
| 10,755,250 B2 | 8/2020 | Dent et al. | |
| 10,832,310 B2 | 11/2020 | Isaacson et al. | |
| 10,909,526 B2 | 2/2021 | Sutter et al. | |
| 10,916,105 B2 | 2/2021 | Carroll et al. | |
| 10,943,229 B2 | 3/2021 | Dolan et al. | |
| 10,983,809 B2 | 4/2021 | Carroll | |
| 11,010,981 B2 | 5/2021 | Goodsitt et al. | |
| 11,037,116 B2 | 6/2021 | Sinha et al. | |
| 11,069,141 B2 | 7/2021 | Wurmfeld et al. | |
| 11,301,681 B2* | 4/2022 | Ju | G06T 19/006 |
| 11,784,818 B2* | 10/2023 | Lopez | H04L 9/3213 |
| 2017/0053252 A1 | 2/2017 | Votaw et al. | |
| 2018/0176272 A1* | 6/2018 | Zur | H10K 85/655 |
| 2019/0107935 A1 | 4/2019 | Spivack et al. | |
| 2019/0377862 A1 | 12/2019 | Benkreira et al. | |
| 2020/0067710 A1 | 2/2020 | Yildiz et al. | |
| 2020/0117788 A1 | 4/2020 | Mohammad | |
| 2020/0226599 A1 | 7/2020 | Adams et al. | |
| 2021/0056187 A1 | 2/2021 | Taylor et al. | |
| 2021/0082257 A1 | 3/2021 | Carroll et al. | |
| 2021/0233128 A1 | 7/2021 | Gabriele et al. | |

OTHER PUBLICATIONS

Nawijn, Bram. "9 Applications of AR & VR in the Financial Industry", Mar. 23, 2018, https://www.tjip.com/en/publications/9-applications-of-ar-vr-in-the-financial-industry.

The Financial Brand. "10 Ways Banks And Credit Unions Are Using Virtual Reality", Nov. 13, 2017, https://thefinancialbrand.com/news/banking-technology/banks-credit-unions-finances-virtual-reality-68593/.

Watson, Tracy. "Benefits and Use Cases of Augmented & Virtual Reality in Banking and Financial Services", Nov. 2, 2021, Skywell Software, https://skywell.software/blog/benefits-use-cases-of-ar-vr-in-banking-and-financial-services/.

* cited by examiner

SYSTEMS AND METHODS FOR A CONNECTED MOBILE APPLICATION WITH AN AR-VR HEADSET

TECHNICAL FIELD

Embodiments and aspects of the present disclosure relate to connected mobile applications with augmented reality (AR) and/or virtual reality (VR) headsets to improve user experiences.

BACKGROUND

Augmented reality (AR) is a technology in which a person's conception of reality can be enhanced, typically through augmented sound, video, and/or graphics displays. AR uses a surrounding (i.e. real-world) environment as a backdrop and, using a display device, overlays digital details against the environmental backdrop for user interaction. Virtual reality (VR) provides a new reality entirely (or at least substantially) by providing a virtual environment with various digital details for user interaction. AR and VR are typically implemented via various technologies, such as a headset display device that may be worn by the user. As AR and/or VR rapidly grow in prominence, it would be advantageous to provide systems and methods for improving and/or enhancing user experiences using AR and/or VR.

SUMMARY

On example embodiment relates to a computer-implemented method. The method includes establishing, by a variable display device, a wireless connection between the display device and a mobile device. The mobile device includes a client account application. The method further includes authenticating, by the variable display device, a user of the variable display device. Authenticating the user includes: receiving, by the variable display device, a prompt for authentication information from the mobile device in response to establishing the wireless connection; transmitting, by the variable display device, the authentication information to the mobile device in response to detecting a selection of authentication information; and receiving, by the variable display device, a notification from the mobile device comprising an indication of verification of the authentication information. The method further includes receiving, by the variable display device, display data from the mobile device in response to the authentication of the user. The display data includes one or more input fields and are associated with the client account application. The method further includes displaying, by the variable display device, a visual environment based on the display data; detecting, by the variable display device, a selection of one or more input fields associated with the client account application within the visual environments; and causing, by the display device, execution of the selection by transmitting the selection to the mobile device.

Another example embodiment relates to one or more non-transitory computer-readable media storing instructions therein that, when executed by at least one processor of a variable display device, cause operations. The operations include establishing a wireless connection between the display device and a mobile device. The mobile device includes a client account application. The operations further include authenticating a user of the variable display device. Authenticating the user includes: receiving a prompt for authentication information from the mobile device in response to establishing the wireless connection; transmitting the authentication information to the mobile device in response to detecting a selection of authentication information; and receiving a notification from the mobile device comprising an indication of verification of the authentication information. The operations further include receiving display data from the mobile device in response to the authentication of the user. The display data includes one or more input fields and are associated with the client account application. The operations further include displaying a visual environment based on the display data; detecting a selection of one or more input fields associated with the client account application within the visual environments; and causing execution of the selection by transmitting the selection to the mobile device.

Yet another embodiment relates a system including a processor and a memory coupled to the processor. The memory has instructions stored thereon that when executed by the processor, cause the processor to: establish a wireless connection with a mobile device including a client account application; authenticate a user; receive display data from the mobile device in response to the authentication of the user, where the display data includes one or more input fields associated with the client account application; generate and display a visual environment based on the display data, where the visual environment is one of an augmented reality environment or a virtual reality environment; detect a selection of one or more input fields associated with the client account application within the visual environment; and cause execution of the selection by transmitting the selection to the mobile device.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementation.

BRIEF DESCRIPTION OF THE FIGURES

The details of one or more implementations are set forth in the accompanying figures and the description below. Other features, aspects, and advantages of the disclosure will become apparent from the description, the drawings, and the claims.

DETAILED DESCRIPTION

Figure 1:
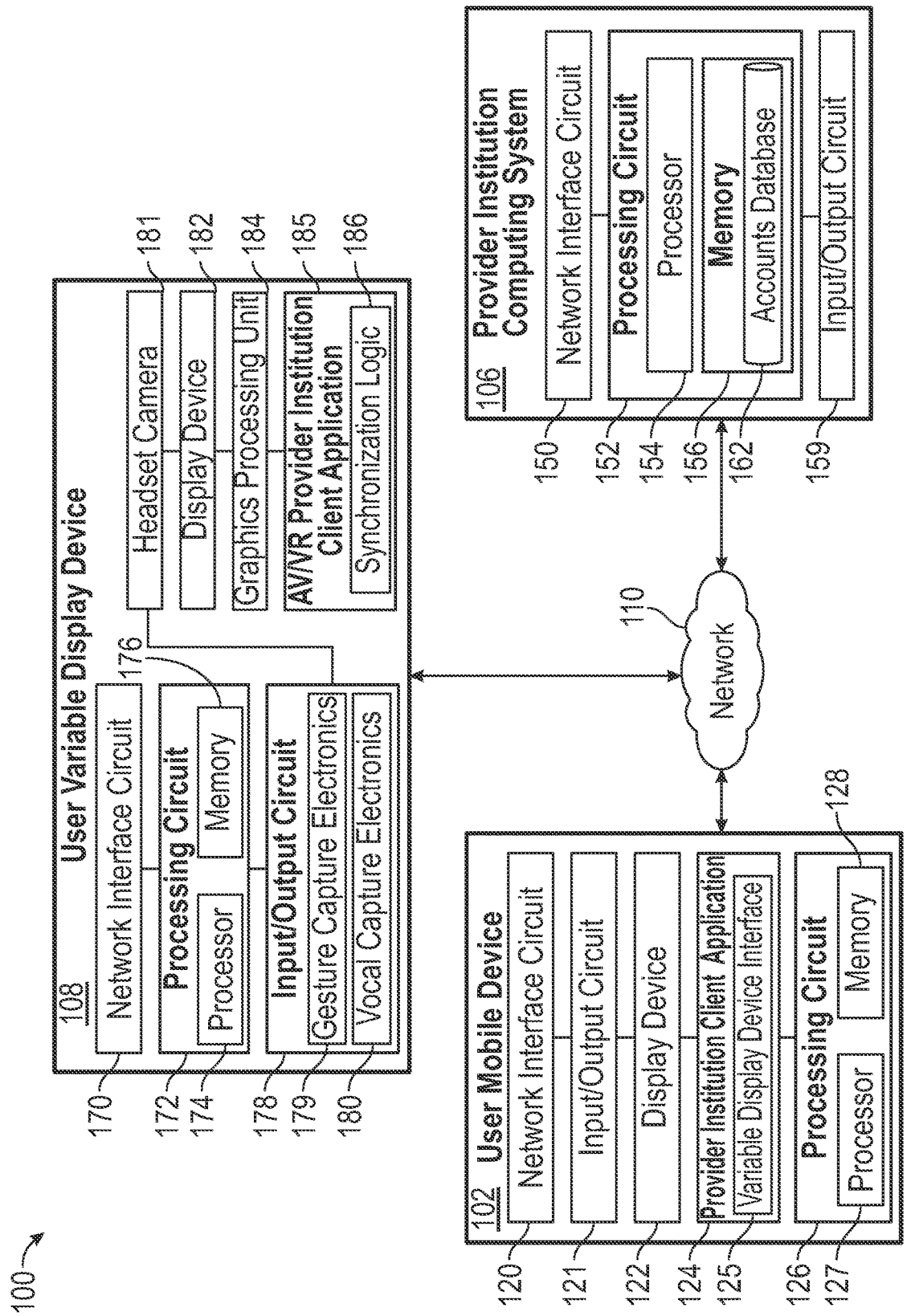
FIG. 1 is a block diagram of a computing system for coupling a client account application of a mobile device with a virtual reality-enabled and/or augmented reality-enabled variable display device, according to an example embodiment.

Referring generally to the figures, systems and methods for connecting mobile applications with augmented reality (AR) and/or virtual reality (VR) devices to improve user experiences are disclosed according to various embodiments herein. The systems, apparatuses, and methods may enable electronic-based transactions using the AR and/or VR devices. More particularly, the systems and methods disclosed herein relate to using AR and/or VR provided by a user variable display device (e.g., an AR electronic headset device, a VR electronic headset device, etc.) in conjunction with a mobile device to control a client application of the mobile device that provides access to a client account, thus enabling a client account transaction via the AR/VR display device. The phrase "AR/VR" is used herein to reflect that the environment may be an augmented reality environment provided by the display device, a virtual reality environment provided by the display device, or that the display device is capable of providing an AR or VR environment to the user. Accordingly, this term should not be construed as the device being capable of providing both AR and VR functionalities in all embodiments.

In various embodiments, a user variable display device and a user mobile device are coupled in order to display and control the client application stored on and executable by the user mobile device via the variable display device. The user mobile device may include a client application at least partially supported by a provider institution computing system associated with a provider institution. The provider institution may, in one embodiment, be a financial institution. As such, the client application may include payment and/or funds-transfer capabilities, as well as various client account management capabilities. In an example illustrative scenario, the user may launch an AR/VR client application on the user variable display device. The AR/VR application may be configured to interface with a client account application stored on a mobile device. The user variable display device may identify a user mobile device associated with a client account and establish a wireless connection. At this stage, the user mobile device provides the user variable display device with a "pre-stage" authorization that enables authentication of the user variable display device to enable use of the client application via the variable user display device. In various embodiments, the user may be authenticated by "tapping" a card (e.g., a debit or credit card) associated with the client account to the variable display device, tapping the user mobile device to the user variable display device, inputting various authentication credentials via the variable display device, and/or providing a one-time-passcode ("OTP") via the variable display device that matches an OTP transmitted to the user mobile device by the provider institution computing system associated with the client account. Once the user is authenticated, the full functionality (or most of the full functionality) of the client account application may be accessed via the user variable display device. Accordingly, the user variable display device may receive data associated with displays generated by the client account application on the user mobile device, generate AR and/or VR environments based on the data, and receive inputs from the user (e.g., hand gestures and/or vocal commands to navigate various menus) to perform one or more client account actions, such as view an account balance, transfer funds, and so on.

In some embodiments, the augmented or virtual reality environment displayed by the user variable display device may be different than the displays typically generated by the user mobile device when operating the client account application. For example, user variable display device may further display a simulated avatar to receive questions, provide answers, and otherwise facilitate the user's navigation of the client account application via the user variable display device.

In some embodiments, the usage of the client account application via the variable display device may be subject to a limited security session. For example, the session may be time-based (e.g., thirty minutes from the point of authentication) and/or be based on activity (e.g., after two minutes of inactivity, the session is ended). Upon the end of the limited security session, the user may be unable to use the client account application via the user variable display device or may be prompted to re-authenticate prior to further use.

The embodiments and implementations of the systems and methods disclosed herein improve current systems for enabling client account transactions by providing enhanced user authentication processes along with enhanced user experiences. For example, the user variable display device, in conjunction with the user mobile device, may provide an AR/VR environment that is easier to navigate for users who are not familiar with the technical procedures involved with manually operating a typical client account application. In this regard, the various AR/VR displays may provide improved visibility of information and simpler explanations for various client account transaction options, and so on. Further, the AR/VR environments may be provided with enhanced user interfaces such as an avatar that provides additional information on executing client account transactions and answers various questions that the user may have. Additionally, the user variable display device, in conjunction with the user mobile device, may offer a more secure and/or private method of operating the client account application than on the user mobile device. For example, various sensitive information regarding a user's account (usernames, passwords, PIN, account balances, etc.) may be discretely presented and interacted with via an enclosed variable display device rather than presented on an user mobile device display that may be visible by fraudsters. Further and as described herein, unconventional authentication processes may be used before enabling usage of the client application via the AR/VR device to enhance security provided by the systems and methods described herein. As such, the systems, methods, and computer implementations disclosed herein may improve current systems for enabling and carrying out client account transactions by providing functionalities that are novel and non-obvious improvements over current systems.

As used herein, the phrase "client account transaction" includes payments, funds-transfers, and/or account management activities (e.g., updating address information, viewing account balance information, viewing a credit score, viewing a transaction history, and so on). As also used herein, the term "tapping" refers to a contact or near-contact event that enables the exchange of information to occur between two devices by placing the two devices in proximity to each other. For example, a "tap" may occur via a near-field communication ("NFC") protocol.

Referring now to FIG. 1, a system 100 for enabling a client transaction via a client account application of a user mobile device using a VR/AR-enabled user variable display device is shown, according to an example embodiment. The system 100 includes a user mobile device 102, a user variable display device 108, and a provider institution computing system 106. The systems, devices, and/or components of the system 100 may be configured to communicate with each other over a network 110. The network 110 may include one or more of the Internet, cellular network, Wi-Fi®, Wi-Max, a proprietary banking network, or any other type of wired, wireless, or a combination of wired and wireless networks.

The user mobile device 102 may be or include any type of mobile device owned by, associated with, managed by, or otherwise operated by a user. As such, the user mobile device 102 includes, but is not limited to, a phone (e.g., a smartphone), a mobile computing device (e.g., a tablet computer, a laptop computer, a personal digital assistant, etc.), a wearable device (e.g., a smart watch, smart glasses, a smart bracelet, etc.), and so on. In some alternate embodiments, the device may be a stationary computing device, such as a desktop computer that is coupled to the network 110. Thus, the term "mobile" is not meant to be limiting to reflect a user computing device. The user may be an individual, business representative, large and small business owner, and so on. The user may be an existing client or a new client to a provider institution associated with the provider institution computing system 106. Furthermore, the user may be the same user of the user variable display device 108.

The user mobile device 102 includes a network interface circuit 120, an input/output circuit 121, a display device 122, a processing circuit 126, and a provider institution client application 124. The network interface circuit 120 is configured or structured to establish connections via the network 110 between the user mobile device 102 and the provider institution computing system 106, and/or the user variable display device 108. The processing circuit 126 includes a processor 127, a memory 128, and may be communicably coupled to the provider institution client application 124.

In some embodiments, the network interface circuit 120 includes one or more antennas or transceivers and associated communications hardware and logic (e.g., computer code, instructions, etc.). The program logic is structured to allow the user mobile device 102 to access and couple/connect to the network 110 to, in turn, exchange information with for example the provider institution computing system 106 and/or the user variable display device 108 (and potentially other systems/devices). That is, the network interface circuit 120 is coupled to the processor 127 and memory 128 and configured to enable a coupling to the network 110. The network interface circuit 120 allows for the user mobile device 102 to transmit and receive data over the network 110. Accordingly, the network interface circuit 120 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 120 enables connectivity to WAN as well as LAN (e.g., Bluetooth, near field communication (NFC), etc. transceivers). Further, in some embodiments, the network interface circuit 120 includes cryptography capabilities to establish a secure or relatively secure communication session between other systems such as the provider institution computing system 106, a second mobile device, the user variable display device 108, etc. In this regard, information (e.g., account information, login information, financial data, display data, and/or other types of data) may be encrypted and transmitted to prevent or substantially prevent a threat of hacking or other security breach. Similarly, encrypted (by, for example, the user variable display device 108) information may be decrypted. To further support features of or interaction with the user mobile device 102, the network interface circuit 120 may provide a relatively high-speed link to the network 110.

The input/output circuit 121 is structured to receive communications from and provide communications to a user of the user mobile device 102. In this regard, the input/output circuit 121 is structured to exchange data, communications, instructions, etc. with an input/output component of the user mobile device 102. The input/output circuit 121 includes hardware and associated logic (e.g., instructions, computer code, etc.) to enable the user mobile device 102 to exchange information with a user and other devices (e.g., the provider institution computing system 106 and/or the user variable display device 108) that may interact with the user mobile device 102. In some embodiments, the input aspect of the input/output circuit 121 allows the user to input or provide information into the user mobile device 102. The output aspect of the input/output circuit 121 allows the user to receive information from the user mobile device 102, and may include, for example, a digital display, a speaker, illuminating icons, light emitting diodes ("LEDs"), and so on. Thus, the input/output circuit 121 may include systems, components, devices, and apparatuses that serve both input and output functions; only input functions; and/or only output functions. Such systems, components, devices and apparatuses may include, for example, radio frequency ("RF") transceivers, near-field communication ("NFC") transceivers, and other short range wireless transceivers (e.g., Bluetooth®, laser-based data transmitters, etc.). The input/output circuit 121 may include communication circuitry for facilitating the exchange of data, values, messages, and the like between an input and/or output device and the components of the user mobile device 102.

In some embodiments, the display device 122 may be a screen, such as a touchscreen or another display device. The user mobile device 102 may communicate information to the user via the display device 122 and/or to receive communications from the user (e.g., through a keyboard provided on the display device 122). In some embodiments, the display device 122 may be a component of the input/output circuit 121, as described above.

The provider institution client application 124 is communicably coupled to the provider institution computing system 106 and may perform certain operations described herein, such as facilitating and enabling client account transactions. In some embodiments, the provider institution client application 124 includes program logic stored in a system memory of the user mobile device 102. In such arrangements, the program logic may configure a processor (e.g., processor 127) of the user mobile device 102 to perform at least some of the functions discussed herein with respect to the provider institution client application 124 of the user mobile device 102. For example and in the embodiment depicted, the provider institution client application 124 may be downloaded from an app store, stored in the memory 128, and selectively executed by the processor 127. In other embodiments, the provider institution client application 124 may be hard-coded into the user mobile device 102. In some embodiments, the provider institution client application 124 is a web-based application. The provider institution client application 124 is communicably coupled to the provider institution computing system 106 for performing one or more functions described herein, including coupling to and communicating with the user variable display device 108 (via the variable display device interface 125 located in the provider institution client application 124).

In some embodiments, the provider institution client application 124 is configured to interface with the provider institution computing system 106 to allow a user to manage the user's associated account (a client account) linked to the provider institution client application 124. Thus, the provider institution client application 124 may be a client account mobile banking application that enables a user to view, access, and manage accounts held by the provider institution (e.g., checking and/or savings account, mortgage account, brokerage account, and so on). The client account may be associated with one or more transaction cards (e.g., debit cards, credit cards, etc.). The provider institution client application 124 may facilitate the user in registering the one or more cards with the client account, enable transactions via the one or more cards, view account balances associated with the one or more cards, activate/deactivate one or more cards, etc. The provider institution client application 124 may further facilitate updating or modifying account information associated with the transaction card (e.g., name, address, etc.), and so on. In some embodiments, the provider institution client application 124 is communicably coupled to the user variable display device 108 (e.g., via a wireless communications channel such as Bluetooth, Internet, Wi-Fi, NFC, and so on) in order to send and receive data packages to facilitate the functionalities of the provider institution client application 124 via the user variable display device 108. Accordingly, in various arrangements, the provider institution client application 124 is communicably coupled via the network interface circuit 120 to the provider institution computing system 106 and/or the user variable display device 108.

As shown, the provider institution client application 124 includes a variable display device interface (or circuit) 125. The variable display device interface 125 is configured to couple to one or more user variable display devices 108. The variable display device interface 125 may convert and the communicate various displays and functions of the provider institution client application 124 to a corresponding application or circuit stored on the user variable display device 108 (e.g., an AR/VR provider institution client application 185 and, in particular, synchronization logic 186 stored thereon), which in turn may be used to provide responsive control signals or other data to the variable display device interface 125 for operating the provider institution client application 124. Thus, as described in greater detail below in regards to FIGS. 2 and 3, some or all of the functionality of the provider institution client application 124 discussed herein may be substantially displayed on the user variable display device 108 and, in turn, controlled using the user variable display device 108 to perform the various AR/VR-enabled client account functions.

In particular, the variable display device interface 125 may be structured to access the program logic of the provider institution client application 124 and provide an interface between the user variable display device 108 and the provider institution client application 124 of the user mobile device 102. The variable display device interface 125 may allow the user variable display device 108 to initialize and maintain communications with the provider institution client application 124 to, for example, receive various inputs detected by the user variable display device 108, provide the inputs to the provider institution client application 124 (which may include transmissions of data to the provider institution computing system 106), determine corresponding responses based on the inputs as determined by the provider institution client application 124, and transmit the corresponding responses to the user variable display device 108. In this sense, the variable display device interface 125 may serve as a "buffer" that adapts the provider institution client application 124 for remote control via the provider institution client application 124 (as opposed to its typical function with respect to direct manual input via the user mobile device 102). Furthermore, by utilizing the variable display device interface 125 as described herein, various displays that may be typically displayed by the provider institution client application 124 may be muted (e.g., not shown on the display device 122 when they otherwise would be under typical manual operation) when such displays are represented via AR/VR environments on the user variable display device 108. It is to be understood that while the variable display device interface 125 has been shown as being part of the provider institution client application 124, in other embodiments, the variable display device interface 125 may be a separate and stand-alone application.

The variable display device interface 125 may be structured to identify AR/VR devices to enable a coupling between the provider institution client application 124 and the AR/VR devices. For example, AR/VR devices such as the user variable display device 108 may have particular device IDs, serial numbers, and so on. The variable display device interface 125 may be configured to convert data from a first format used by the provider institution client application 124 (e.g., GIF, JPEG, BMP, MP4, and so on) into a second format used by AR/VR devices such as the user variable display device 108. For example, the variable display device interface 125 may convert data from the first format into a three-dimensional format that defines the various displays of the provider institution client application 124 in terms of geometry, appearance (e.g., color, texture, and/or materials), scenery (the position and effect of real or simulated light sources), and animations. In general, such three-dimensional files may at least include three-dimensional point-maps of image data. Specially, the second format for use on the user variable display device 108 may be BLEND, DWG, zprj, .bw, FBX, and so on). In some embodiments, this conversion takes place via the user variable display device 108.

The user variable display device 108 is a device configured to present a user with visual and/or auditory content, particularly VR/AR content. The user variable display device 108 may include any type of equipment capable of presenting a simulated virtual or augmented reality to the user. In the example shown, the user variable display device 108 is a headset that encloses the eyes of a user so that the user may only perceive the content displayed by the user variable display device 108 (i.e., worn by the user). In some embodiments, the headset display device 182 is a head-mounted display ("HMD") or the like, although it should be appreciated that the various systems and methods disclosed herein may be carried out by any device capable of providing various virtual or augmented reality displays with which the user may interact. For example, the user variable display device 108 may be structured differently (e.g., eyeglasses, an enclosed AR/VR theatre room, etc.). The content presented to the user may be based at least in part on enabling and completing client transactions. In particular, the content presented to the user may be based at least in part on enabling and completing online transaction services and functionality at least insofar as it may be conducted on a provider institution client application of a mobile device (as suggested above in regards to the provider institution client application 124 on the user mobile device 102 as discussed above, for example).

As shown, the user variable display device 108 includes a network interface circuit 170, a processing circuit 172, an input/output circuit 178, a camera 181, a display device 182, a graphics processing unit (GPU) 184, and an AR/VR provider institution client application 185 having synchronization logic 186. The input/output circuit includes gesture capture electronics 179, vocal capture electronics 180, and a headset display device 182. The gesture capture electronics 179 include a headset camera 181 and the vocal capture electronics include a headset microphone.

In some embodiments, the user variable display device 108 may be configured to receive content over the network 110 from the user mobile device 102 and/or the provider institution computing system 106 (via the network interface circuit 170) to present to the user via the headset display device 182. In some arrangements, the user variable display device 108 can include a content database (e.g., a memory 176 of the processing circuit 172) storing content to be presented to the user as well as content selection logic, stored in the memory 176 of the processing circuit 172. The content selection logic may be executed by a processor 174 of the processing circuit 172 and is configured to select content stored in the database to present to the user. In other arrangements, the user variable display device 108 may receive the content to be presented to the user from other components of the system 100 (e.g., the provider institution computing system 106 and/or the user mobile device 102). In other arrangements still, the variable display device may present content to the user from a combination of content stored in the memory 176 and content received from the other components of the system 100.

In some embodiments, the memory 176 includes one or more memory devices (e.g., RAM, NVRAM, ROM, Flash Memory, hard disk storage) that store data and/or computer code for facilitating the various processes described herein. That is, in operation and use, the memory 176 stores at least portions of instructions and data for execution by the processor 174 to control the processing circuit 172. The memory 176 may be or include tangible, non-transient volatile memory and/or non-volatile memory. The processor 174 may be implemented as one or more processors, application specific integrated circuits (ASIC), one or more field programmable gate arrays (FPGAs), a digital signal processor (DSP), a group of processing components, or other suitable electronic processing components. The processing circuit 172 may perform or assist in performing certain of the operations, steps, or methods discussed herein.

In some embodiments, the network interface circuit 170 may include one or more antennas or transceivers and associated communications hardware and logic (e.g., computer code, instructions, etc.). The network interface circuit 170 includes program logic that is structured to allow the user variable display device 108 to access and couple to the network 110 to, in turn, exchange information with for example the user mobile device 102 and/or the provider institution computing system 106. That is, the network interface circuit 170 is coupled to the processor 174 and memory 176 and configured to enable a coupling to the network 110. The network interface circuit 170 allows for the user variable display device 108 to transmit and receive internet data and telecommunication data. Accordingly, the network interface circuit 170 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 170 enables connectivity to WAN as well as LAN (e.g., Bluetooth, radio frequency, NFC, etc. transceivers).

The input/output circuit 178 is structured to receive communications from and provide communications to a user of the user variable display device 108. In this regard, the input/output circuit 178 is structured to exchange data, communications, instructions, etc. with an input/output component of the user variable display device 108. The input/output circuit 178 includes hardware and/or associated logic (e.g., instructions, computer code, etc.) to enable the user mobile device 102 to exchange information with a user and other devices (e.g., the provider institution computing system 106) that may interact with the user variable display device 108. In some embodiments, the input aspect of the input/output circuit 178 allows the user to input or provide information into the user variable display device 108 (e.g., gesture capture electronics 179 and/or vocal capture electronics 180), detect the environment in the user's field of view, detect a location and/or relative movement of the user variable display device 108, and may include machine-readable media for facilitating the exchange of information between the input/output device and the components of the user mobile device 102. Thus, the input/output circuit 178 may further include any combination of hardware components, for example, a mechanical keyboard, a touchscreen, a camera (e.g., camera 181), a fingerprint scanner, a microphone, a retinal scanner, a device that is able to be coupled to the user mobile device 102 via a connection (e.g., USB, serial cable, Ethernet cable, etc.), accelerometers, GPS receivers, gyroscopes, and so on. The output aspect of the input/output circuit 178 allows the user to receive information from the user variable display device 108, and may include, for example, a digital AR/VR display (e.g., display device 182), a speaker, illuminating icons, light emitting diodes ("LEDs"), and so on. Thus, the input/output circuit 178 may include systems, components, devices, and apparatuses that serve both input and output functions; only input functions; and/or only output functions. The input/output circuit 178 may include communication circuitry for facilitating the exchange of data, values, messages, and the like between an input and/or output device and the components of the user variable display device 108.

The display device 182 may be a screen or another display device that allows viewing of AR/VR environments that are projected by the user variable display device 108 into the user's field of view. In other words the display device 182 provides an interactive AR/VR environment to the user. The interactive AR/VR environment may present, via the display device 182, various digital details regarding the client account and client account transaction operations. As discussed above, such AR/VR environments may be based on display data generated by the provider institution client application 124 and provided by the variable display device interface 125.

The user variable display device 108 may receive communications from the user (e.g., through the gesture capture electronics 179, the vocal capture electronics 180, and/or a keyboard or various buttons provided on the user variable display device 108). In some embodiments, the gesture capture electronics 179 detect the user's gestures (e.g., hand movements) with respect to the digital details of the AR/VR environments that are projected by the user variable display device 108 into the user's field of view. For example, the gesture capture electronics 179 may be communicably coupled to the camera 181, which may detect the presence and/or motion of the user's hand(s) and provide gesture data regarding the user's hand movements to the processing circuit 172. As another example, the gesture capture electronics 179 may be communicably coupled to one or more hand-held motion-capture devices which include accelerometer(s) and/or gyroscope(s) in order to similarly provide such gesture data. The processing circuit 172 may in turn reference the gesture data against the projection data suggested above to determine selections or other navigations of the interactive AR/VR environments. Further, the vocal capture electronics 180 may capture vocal inputs provided by the user. Accordingly, the vocal capture electronics 180 may include a microphone.

The AR/VR provider institution client application 185 is structured to enable a user to manage his/her account from the user variable display device 108 by accessing the functionality of the provider institution client application 124 discussed herein. For example and in the embodiment depicted, the AR/VR provider institution client application 185 may be downloaded from an app store, stored in the memory 176, and selectively executed by the processor 174. In other embodiments, the AR/VR provider institution client application 185 may be hard-coded into the user variable display device 108. As shown, the AR/VR provider institution client application 185 includes synchronization logic 186. The synchronization logic 186 may be program logic included with the AR/VR provider institution client application 185, which may be stored in the memory 176 of the user variable display device 108. The AR/VR provider institution client application 185 may include a unique identifier (e.g., a numeric or alphanumeric code, etc.). The unique identifier may be used to identify the AR/VR provider institution client application 185 as an AR/VR-enabled application that is associated with the provider institution associated with the provider institution computing system 106. That way, the provider institution computing system 106 can distinguish between client applications installed and operating on AR/VR-enabled devices and those not installed on AR/VR-enabled devices.

The synchronization logic 186 is structured or configured to facilitate a communication between the AR/VR provider institution client application 185 and the provider institution client application 124 (via the variable display device interface 125, as discussed above) such that the provider institution client application 124 may receive input(s) from the AR/VR provider institution client application 185 and provide response(s) and/or update(s) (in the form of display data, as described herein) to the AR/VR provider institution client application 185. In other words, the synchronization logic 186 may enable a communication session that syncs the operation of the provider institution client application 124 with the AR/VR provider institution client application 185 to provide certain AR/VR environments to the user via the user variable display device 108. The synchronization logic 186 may allow the various displays typically displayed via the provider institution client application 124 to be generated as AR/VR environments on the user variable display device 108 by transmitting various user inputs received via the user variable display device 108 to the provider institution client application 124, and receiving response(s) from the provider institution client application 124 based on the transmitted user inputs. The synchronization logic 186 may be communicably coupled to the GPUs 184 in order to generate the AR/VR environments. Further, the synchronization logic 186 may be configured to receive additional display data not from the provider institution computing system 106 for augmentation onto display data received by the variable display device interface 125 (and consequently, presentation as AR/VR environments). For example, the provider institution computing system 106 may provide additional data used for improved functionality of the AR/VR environments (e.g., an avatar used to facilitate the displays otherwise associated with the provider institution client application 124). It is to be understood that while the synchronization logic 186 has been shown as being part of the AR/VR provider institution client application 185, in other embodiments, the synchronization logic 186 may be a separate and stand-alone application.

The user variable display device 108 further includes one or more GPU(s) 184. The GPU 184 is configured to create AR/VR environments, which may be stored in a portion of the memory 176 of the variable display device. In some embodiments, the GPU 184 may manipulate portions of the content (e.g., display data) received from the variable display device interface 125 and/or the provider institution computing system 106 to create a frame buffer so that content displayed to the user via the input/output circuit 178 is constantly updated (e.g., to generate AR/VR graphics that transition between one frame of an AR/VR environment to another). As suggested above, the GPU 184 may be configured, alone or in conjunction with the processing circuit 172, to receive prompts and information from components in the system 100 (e.g., the variable display device interface 125 of the user mobile device 102 and/or the provider institution computing system 106) and generate various AR/VR environments based on the provided prompts and information.

The provider institution computing system 106 is a computing system associated with a provider institution. The provider institution computing system 106 may maintain a plurality of user accounts having various information. The provider institution may include commercial or private banks, credit unions, investment brokerages, other financial institutions, etc. In the example shown, the provider institution is an issuer of a transaction card of the user. In the example shown, the provider institution computing system 106 is structured as a backend computing system that may comprise one or more servers. In some embodiments, the provider institution computing system 106 includes a network interface circuit 150, a processing circuit 152, and an input/output circuit 159.

In some embodiments, the network interface circuit 150 may include one or more antennas or transceivers and associated communications hardware and logic. The network interface circuit 150 includes program logic that is structured to allow the provider institution computing system 106 to access and couple/connect to the network 110 via one or more transceivers to, in turn, exchange information with for example the user variable display device 108 and/or the user mobile device 102. That is, the network interface circuit 150 is coupled to the processor 154 and one or more memory devices 156 and configured to enable a coupling to the network 110. The network interface circuit 150 allows for the provider institution computing system 106 to transmit and receive data. Accordingly, the network interface circuit 150 includes any one or more of a cellular transceiver, a wireless network transceiver, and a combination thereof. Thus, the network interface circuit 150 enables connectivity to WAN as well as LAN. Further, in some embodiments, the network interface circuit 150 includes cryptography capabilities to establish a secure or relatively secure communication session between other systems such as the user mobile device 102 and/or the user variable display device 108. In this regard, information (e.g., account information, login information, financial data, custom card art, and/or other types of data) may be encrypted and transmitted to prevent or substantially prevent a threat of hacking or other security breach.

The network interface circuit 150 may include any combination of a wireless network transceiver (e.g., Bluetooth® transceiver, cellular modem, a Wi-FiR transceiver) and/or wired network transceiver (e.g., an Ethernet transceiver). In some arrangements, the network interface circuit 150 includes hardware and machine-readable media structured to support communication over multiple channels of data communication (e.g., wireless, Bluetooth R, near-field communication, etc.). In yet other arrangements, the network interface circuit 150 may include one or more cryptography modules to establish a secure communication session (e.g., using the IPSec protocol or similar) in which data communicated over the session is encrypted and securely transmitted.

The at least one processing circuit 152 may include one or more processors 154 coupled to one or more memory devices 156. The at least one processing circuit 152 may be communicably connected to the network interface circuit 150 and the input/output circuit 159. The one or more memory devices 156 includes one or more memory devices (e.g., RAM, NVRAM, ROM, Flash Memory, hard disk storage) that store data and/or computer code for facilitating the various processes described herein. That is, in operation and use, the one or more memory devices 156 store at least portions of instructions and data for execution by the processor 154 to perform various operations. The one or more memory devices 156 may be or include tangible, non-transient volatile memory and/or non-volatile memory. The processor 154 may be implemented as one or more processors, application specific integrated circuits (ASIC), one or more field programmable gate arrays (FPGAs), a digital signal processor (DSP), a group of processing components, or other suitable electronic processing components.

The one or more memory devices 156 may include an accounts database 162. The accounts database 162 is structured to retrievably store information regarding client accounts held by various users at the provider institution, such as a client account held by the user of the user mobile device 102. For instance, the accounts database 162 may store information related to the user and/or the user mobile device 102, such as authentication information (e.g., username/password combinations, device authentication tokens, security question answers, etc.), user information (e.g., name, date of birth, etc.), account information (e.g., account number, account balance information, expiration date, etc.), and so on. The accounts database 162 may further store, in association with the user's client account, information associated with an account such as card information. Furthermore, the accounts database 162 may store user preferences and other information that may be included with a user profile. In various embodiments, the accounts database 162 is structured as one or more remote data-storage facilities (e.g., cloud servers).

Figure 2:
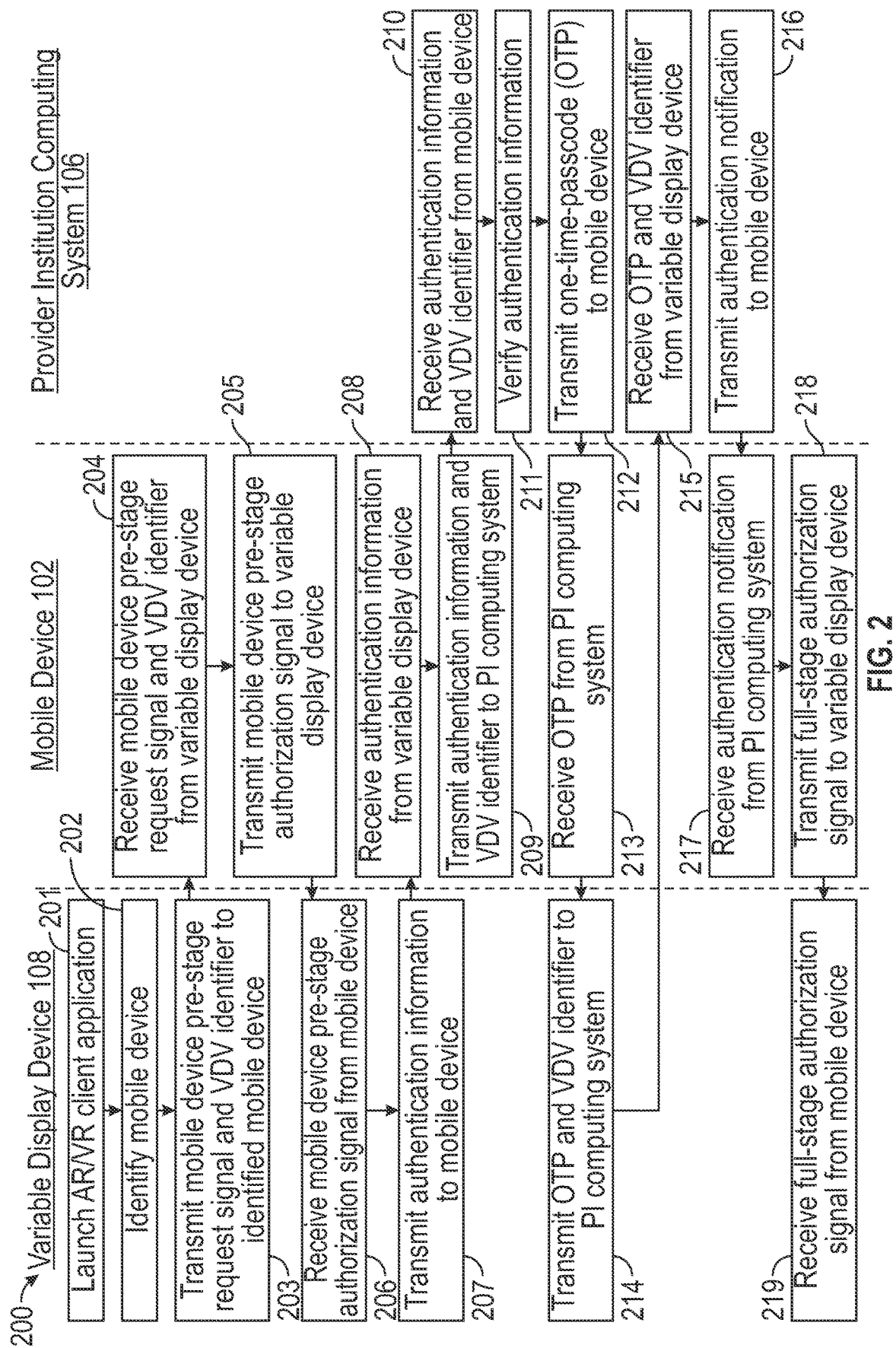
FIG. 2 is a flow diagram of a method for authenticating a user of the variable display device of FIG. 1 to enable a user action via the variable display device of FIG. 1, according to an example embodiment.

Referring now to FIG. 2 in combination with FIG. 1, an example method 200 for enabling an AR/VR-enabled client account transaction via a client account application of a mobile device using a variable display device is shown, according to an example embodiment. As described in greater detail below and in one embodiment, the AR/VR provider institution client application 185 is launched and the user variable display device 108 identifies the user mobile device 102 to establish a connection between the user variable display device 108 and the user mobile device 102. Subsequently, a client account transaction is enabled via the user variable display device 108. Because method 200 may be implemented with the system 100 shown in FIG. 1, reference may be made to one or more components of FIG. 1 in explaining method 200.

At process 201, the user variable display device 108 launches the AR/VR provider institution client application 185. In order to activate or launch the AR/VR provider institution client application 185, a user may first activate the user variable display device 108 and place (e.g., mount, attach, etc.) the user variable display device 108 on the user's head (in the event that the user variable display device 108 is an HMD). The user variable display device 108 in turn may display a home screen AR/VR (e.g., an AR/VR environment depicting a home screen of the of user variable display device 108).

As used herein, "AR/VR environment" refers to a visual environment generated by the GPU 184 that is displayed to the user via the display device 182. As described in greater detail below with reference to FIG. 3, display data may be extracted from the provider institution client application 124 by the variable display device interface 125 and provided to the user variable display device 108 (e.g., wirelessly via the Internet, Bluetooth® or another wireless connection), where the display data is stored in the memory 176 of the user variable display device 108. The GPU 184 may then retrieve the display data and convert the display data into a corresponding AR/VR environment. In some embodiments, the AR/VR environment is an AR environment. Accordingly, the camera 181 detects real-time image data of the user's surrounding real-world environment (e.g., capturing image data at a frame rate of X frames per second, such as twenty frames per second or greater) and provides the image data to the GPU 184. The GPU 184, in turn, augments (e.g., overlays) digital details (generated based on the AR/VR data suggested above) over the real-time image data to generate a display of various digital details augmented on a backdrop of the user's real-world environment. The user may select or otherwise interact with the digital details in order to make selections or determinations in order to accomplish certain functions described herein. In other embodiments, the AR/VR environment is a VR environment. Accordingly, the GPU 184 generates an entirely (or substantially entirely) new environment (based on the AR/VR data suggested above) that includes digital details that the user may similarly select or otherwise interact with. In other words, the camera 181 may not be necessary to generate a VR environment. From the AR/VR home environment, the user may select and launch the AR/VR provider institution client application 185, which may retrieve AR/VR data regarding a home screen from the memory 176, generate an AR/VR environment based on the AR/VR data regarding the home screen using the GPU 184, and display the AR/VR environment via the display device 182.

The home screen AR/VR environment may include various digital details associated with applications stored in the memory 176 or otherwise associated with the user variable display device 108, such as the AR/VR provider institution client application 185. The home screen AR/VR environment may further display various options and settings regarding the operation of the user variable display device 108.

In some embodiments, the AR/VR provider institution client application 185 is launched in response to vocal inputs selecting the AR/VR provider institution client application 185. For example, the user may vocalize "banking", "client application", or any vocal command associated with launching the AR/VR provider institution client application 185. Given that the AR/VR provider institution client application 185 is provided and at least partly supported by the provider institution, certain finance-related words (e.g., banking, account, etc.) may be predefined as key words in the AR/VR provider institution client application 185 such that upon detection by the user variable display device 108 while in use, the AR/VR provider institution client application 185 is launched. The vocal command(s) may be detected by the vocal capture electronics 180 (e.g., using a microphone). The vocal capture electronics 180 may thus include speech recognition software configured to convert an audio signal detected by the microphone into words that may be matched with various words associated with launching the AR/VR provider institution client application 185. In other embodiments, the AR/VR provider institution client application 185 is launched in response to detecting gesture inputs (via the gesture capture electronics 179) selecting the AR/VR provider institution client application 185. For example, the user may select from the home screen a digital detail associated with the AR/VR provider institution client application 185 (e.g., a box that says "banking", a three-dimensional depiction of an bank, etc.) displayed at the home screen. As discussed above, the gesture capture electronics 179 may detect gestures selecting such digital details via the camera 181, or by tracking hand-held motion-capture devices that provide inputs indicative of a selection of such digital details. In other embodiments still, the AR/VR provider institution client application 185 is launched in response to the user pressing a button on the user variable display device 108. For example, the input/output circuit 178 of the user variable display device 108 may include a button disposed on a surface of the user variable display device 108 that the user may press in order to launch the AR/VR provider institution client application 185. In even other embodiments, the AR/VR provider institution client application 185 is launched in response to the user tapping a transaction card or the user mobile device 102 to the user variable display device 108.

At process 202, the AR/VR provider institution client application 185 identifies a mobile device (the user mobile device 102 in this example) to establish a connection with (e.g., communicably couple to) the user variable display device 108 in order to initiate a client account transaction. In some embodiments, the AR/VR provider institution client application 185 determines a mobile device identifier of the user mobile device 102 as being a mobile device associated with a provider institution client application associated with a client account of the user of the user variable display device 108. As used herein, the "mobile device identifier" of the user mobile device 102 may include any device-specific information regarding the user mobile device 102 stored in the accounts database 162 of the provider institution computing system 106 that may be used to establish a wireless connection (e.g., serial number, SSID, IP address, device name, phone number, etc.).

In some embodiments, the AR/VR provider institution client application 185 communicates with the provider institution computing system 106 to retrieve the mobile device identifier of the user mobile device 102. In some arrangements, the AR/VR provider institution client application 185 determines the mobile device identifier of the user mobile device 102 in response to the user tapping the transaction card to the user variable display device 108 as described above with reference to process 201 (e.g., launching the AR/VR provider institution client application 185 by tapping the transaction card to the user variable display device 108). The user variable display device 108 may transmit card-specific information to the provider institution computing system 106, along with a request to identify a mobile device storing a provider institution client application with a client account to which a card corresponding to the card-specific information is registered. The provider institution computing system 106 may then retrieve a mobile device identifier of such a mobile device (the user mobile device 102 in this example) and transmit the mobile device identifier to the user variable display device 108 (and the AR/VR provider institution client application 185 stored thereon). In other arrangements, the AR/VR provider institution client application 185 may determine the mobile device identifier of the user mobile device 102 in response to the user tapping the user mobile device 102 to the user variable display device 108. The user variable display device 108 may receive the mobile device identifier from the user mobile device 102 via the tap. Further, the user mobile device 102 may receive a variable display device identifier associated with the user variable display device 108, as discussed in greater detail below. For security purposes, the user mobile device 102 may transmit the variable display device identifier to the provider institution computing system 106. Based on successful completion of any one or more of the other authentication steps as described herein, the provider institution computing system 106 may store the variable display device identifier as an approved device for syncing with the user mobile device 102. In some cases, the provider institution computing system 106 may store the variable display device identifier as an exclusive device (or AR/VR device specifically) approved for syncing with the user mobile device 102 as described herein.

At process 203, the user variable display device 108 transmits a mobile device pre-stage request signal to the variable display device interface 125 of the user mobile device 102 based on the identification regarding the user mobile device 102 determined at process 202. The mobile device pre-stage authentication request includes a variable display device identifier of the user variable display device 108. As used herein, the "variable display device identifier" of the user variable display device 108 may include any device-specific information regarding the user variable display device 108 that may be used to establish a wireless connection (e.g., serial number, SSID, IP address, device name, etc.) in order to enable the various functions described herein. In various arrangements, the variable display device identifier of the user variable display device 108 may be required to allow the user mobile device 102 to engage in communication(s) with the user variable display device 108, as well as identify the user variable display device 108 for authentication procedures involving the provider institution computing system 106, as described in greater detail below.

In one embodiment, the provider institution client application 124 must be running (e.g., open/previously launched where the screens are able to be navigated through) to perform the various functions described herein via the user variable display device 108. In some embodiments, the variable display device interface 125 receives the mobile device pre-stage request signal at process 204 and makes a determination as to whether the provider institution client application 124 is running. If the provider institution client application 124 is running, the variable display device interface 125 provides a mobile device pre-stage authorization signal to the AR/VR provider institution client application 185 at process 205. In some arrangements, if the provider institution client application 124 is not running, the variable display device interface 125 launches the provider institution client application 124 and provides the mobile device pre-stage authorization signal to the AR/VR provider institution client application 185 at process 205. In other arrangements, if the provider institution client application 124 is not running, the variable display device interface 125 provides a prompt to the user variable display device 108 that the provider institution client application 124 must be activated. In turn, the user of the user variable display device 108 may manually operate the user mobile device 102 to launch the provider institution client application 124. In response to the provider institution client application 124 being manually launched, the variable display device interface 125 provides the mobile device pre-stage authorization signal to the AR/VR provider institution client application 185 at process 205.

Upon the launch of the provider institution client application 124, the provider institution client application 124 may process data transmissions. For example, the variable display device interface 125 may receive data transmissions from the user variable display device 108 and/or provider institution computing system 106, provide the data transmissions as data inputs to the provider institution client application 124, determine corresponding data outputs, and provide the corresponding data outputs to the user variable display device 108 and/or the provider institution computing system 106. In other words, the provider institution client application 124 receives and sends communications with the user variable display device 108. Beneficially, the provider institution client application 124 may enable a client account transaction without generating some or all of the displays and/or graphical user interfaces being generated on the display device 122 of the user mobile device 102, as may typically occur during a manual operation of the provider institution client application 124. If the provider institution client application 124 is viewed on the user mobile device 102 during such management, the variable display device interface 125 may provide a display indicating that the provider institution client application 124 is presently being controlled by a variable display device, such as the user variable display device 108. In this regard, controlling the operation of the provider institution client application 124 via the user variable display device 108 allows for a client account transaction that is secure from third parties, because the user variable display device 108 provides a private interface to conduct the client account transaction while the variable display device interface 125 "mutes" any corresponding displays or GUIs that would otherwise be presented via the user mobile device 102.

Moreover, in certain embodiments, the provider institution client application 124, while managed by the variable display device interface 125 as described herein, may not accept manual user inputs via the display device 122, regardless of whether the user mobile device 102 generates such corresponding displays or GUIs. The variable display device interface 125 may intercept such manual user inputs and prevent the user inputs from being provided to the provider institution client application 124. Thus and in one embodiment, the provider institution client application 124 may be operated by a single device (the user variable display device 108) without any conflicting user inputs obstructing the execution of the client account transaction via the user variable display device 108 as described herein. In another embodiments, the provider institution client application 124 may feature an override function for manual input and making decisions on the provider institution client application 124 that supersede input provided by the user variable display device 108 and/or disconnecting the user variable display device 108 (or any other remote devices communicably coupled with the provider institution client application 124).

At process 206, the AR/VR provider institution client application 185 receives the mobile device pre-stage authorization signal. The mobile device pre-stage authorization signal authorizes the AR/VR provider institution client application 185 to perform one or more client transactions independent of the provider institution client application 124 of the user mobile device 102. In operation and in one embodiment, synchronization logic 186 of the AR/VR provider institution client application 185 is configured to communicate with the variable display device interface 125 of the user mobile device 102 in order to operate the provider institution client application 124 via the user variable display device 108, as described in greater detail below with reference to FIG. 3.

As detailed in processes 207-219 below, prior to allowing a user of the user variable display device 108 to initiate an AR/VR-enabled client account transaction on the provider institution client application 124, the user may first be required to be "authenticated" as an account holder to initiate an authenticated session that provides access to the full functionality of the provider institution client application 124. Thus, the "authenticated session" refers to a usage of the provider institution client application 124 (via the user variable display device 108) following authentication of the user of the user variable display device 108. As explained in processes 207-219, the user may complete the authentication process via the user variable display device 108. The authenticated session may be based on inputs detected by the user variable display device 108 and transmitted to the user mobile device 102. The authenticated session itself may be managed (e.g., monitoring of an expiration period) by the user mobile device 102. For example, while the user variable display device 108 may collect various inputs associated with user authentication information, the user authentication information may need to be verified by the provider institution computing system 106. As such, the user variable display device 108 may receive user authentication information from the user, transmit the user authentication information to the user mobile device 102, which in turn transmits the user authentication information to the provider institution computing system 106 for verification. Alternatively, the variable display device 108 may transmit the information to the provider institution computing system for verification or, may perform the verification itself with stored data on the variable display device 108. The authenticated session may expire after a certain duration of time with or without action of the user related to the provider institution client application 124 (e.g., transmissions from the user variable display device 108 to the user mobile device 102 regarding the provider institution client application 124). The provider institution client application 124 may be structured to transmit a message to the user variable display device 108 prompting the user to provide user authentication information in the event the authenticated session expires. Thus, the various AR/VR environments displayed to the user as described herein may be interrupted by the authentication AR/VR environment prompting for re-entry of one or more login credentials.

Accordingly, at process 207, the user variable display device 108 receives and transmits "user authentication information" to the user mobile device 102 in response to the prompts for authentication information displayed in the authentication AR/VR environment as discussed above. As used herein, the term "user authentication information"

refers to data indicative of an identity of the user of the user variable display device 108. The user authentication information may be received via the AR/VR environment provided by the user variable display device 108. The user authentication information includes any of a password, a PIN (personal identification number), a user ID (e.g., a username, an alpha, numeric, or alphanumeric value regarding the user, etc.), an answer to a verification question, a biometric (e.g., a picture of the user's face, a fingerprint, a voice sample, a retina scan, etc.), transaction card information via tapping the transaction card, variable display device information via tapping the user mobile device 102, and/or a combination thereof.

At process 208, the user mobile device 102 (via the variable display device interface 125 stored thereon) receives the user authentication information from the user variable display device 108. As suggested above, user authentication information may include transaction card information or mobile device information exchanged via short-range wireless communication. Thus, the user may be authenticated by tapping the transaction card and/or the user mobile device 102 to the user variable display device 108. For example, the transaction card may be associated with a client account associated with the provider institution associated with the provider institution computing system 106. The transaction card may be a contactless-enabled card having a NFC chip that transmits information to a NFC receiver. The transaction card may be brought within a predetermined distance (e.g., 10 cm, 20 cm, etc.) of the user variable display device 108 in order to send or provide a wireless transmission of a payload (e.g., data package) from the NFC chip embedded on the transaction card to an NFC reader of the input/output circuit 178 of the user variable display device 108. The data package or payload may include the transaction card information, which may be card-specific information relating to the card (e.g., the card number or card token, expiration date, CVC, cardholder name, and so on). As such, upon a tap of the transaction card to the user variable display device 108, information stored by the card is transmitted wirelessly to the user variable display device 108. The user variable display device 108 may then transmit the data package to the user mobile device 102. As another example, the user mobile device 102 may be brought within a predetermined distance of the user variable display device 108 in order to transmit or receive a wireless transmission of a payload between the user mobile device 102 and the user variable display device 108. In this latter configuration, the mobile device information may be sent directly from the user variable display device 108 to the provider institution computing system for authentication and not back to the mobile device.

At process 209, the user mobile device 102 transmits the transaction card information (along with any other authentication information received at process 208) to the provider institution computing system 106, which receives the user authentication information at process 210 for verification at process 211. For example, the transaction card may be associated with a client account registered to the provider institution client application 124, and thus known transaction card information may be stored in the account database 162 of the provider institution computing system 106 (e.g., to track transaction history such as purposes, for authentication, etc.). The provider institution computing system 106 may then verify that the transaction card information matches the known transaction card information in order to verify the user, along with verification of any other authentication information received from the user mobile device 102. Additionally, the user mobile device 102 may transmit the variable display device identifier of the user variable display device 108 to the provider institution computing system 106. The variable display device identifier of the user variable display device 108 may be used by the provider institution computing system 106 to complete additional authentication of the user of the user variable display device as described below with reference to processes 212-216. In some embodiments, authentication information is transmitted directly from the user variable display device 108 to the provider institution computing system 106 for authentication, rather than via the user mobile device 102. In such arrangements, where the user taps the transaction card to the user variable display device 108, the transaction card information may be directly transmitted to the provider institution computing system 106. Further, where the user taps the user mobile device 102 to the user variable display device 108, device information regarding the user mobile device 102 may be transmitted to the provider institution computing system 106 (rather than the user mobile device 102 receiving variable display device information from the user variable display device 108). In this sense, authentication information may be provided to the provider institution computing system 106 either directly from the user variable display device 108 or via the user mobile device 102 as an intermediary, depending on the implementation.

If the user authentication information received by the provider institution computing system 106 at process 210 does not match the known user authentication information, the user of the user variable display device 108 is not authenticated at process 211, and the method 200 ends. For example, the provider institution computing system 106 may transmit a rejection message to the user mobile device 102, which may in turn forward the rejection message to the user variable display device (via the variable display device interface 125) for display to the user of the user variable display device 108. The description of the method 200 continues for the situation in which the user is authenticated at process 211 with respect to the user authentication information provided at process 210.

At processes 212-215, the provider institution computing system 106 completes authentication of user of the user variable display device based on a verification of the user. The user's verification/verified possession of the user mobile device 102 may also serve as a factor in authenticating the user (e.g., in addition to the authentication information discussed above).

The user's possession/control of the user mobile device 102 may be verified via the provider institution computing system 106 transmitting a one-time-passcode (OTP) to the user mobile device 102 at process 212. A copy/duplicate of the OTP may be stored by the provider institution computing system 106. The OTP may be provided at process 212 within the provider institution client application 124, via email, via text message, via a push notification, a combination thereof, and so on. A prompt may also be provided via, for example, the provider institution client application 124 and/or the AR/VR provider institution client application 185 for the client to enter the OTP in the user variable display device 108 within a predefined amount of time. The user may manually input the OTP (e.g., as a "user-input" OTP) to the user variable display device 108, which may in turn transmit the user-input OTP, along with a variable device identifier of the user variable display device 108 to the provider institution computing system 106 at process 214 for verification of the user-input OTP and the variable display device identifier of the user variable display device 108 at process 215. As such, the user may in turn provide the OTP to the user variable display device 108 to be verified by the provider institution computing system 106 at process 215. The provider institution computing system 106 verifies that the user-input OTP matches the stored OTP and that the variable display device identifier of the user variable display device 108 received at process 214 (from the user variable display device 108) matches the variable display device identifier of the user variable display device 108 received at process 209 (from the user mobile device 102). By matching the two variable display device identifiers of the user variable display device 108, the provider institution computing system 106 may confirm that the device (the user variable display device 108, in this example) that communicated with the user mobile device 102 to initiate the authentication process is the same device that completed the authentication process via the OTP exchange with the provider institution computing system 106, thus confirming the security of the authentication process described herein (e.g., no foreign devices were used to complete the OTP exchange).

At process 216, if the provider institution computing system 106 verifies the OTP and the identification information, the provider institution computing system 106 may in turn transmit an authentication notification to the user mobile device 102 and/or the user variable display device 108. At process 217, the user mobile device 102 receives the authentication notification. If the authentication notification provided at process 217 indicates that the OTPs did not match and/or the variable display device identifiers do not match, the user of the user variable display device 108 is not authenticated, and the method 200 ends. For example, the user mobile device may forward the authentication determination to the user variable display device 108 for display to the user via the user variable display device 108. The description of the method 200 continues for the situation in which the user is authenticated with respect to the OTP and the variable display device identifier provided at process 214.

As an alternative (or in addition) to processes 212-217, the user's possession/control of the user mobile device 102 may be verified by tapping the user mobile device 102 to the user variable display device 108. As suggested above, the input/output circuit 121 of the user mobile device 102 may include an NFC chip and an associated controller that configures the chip to exchange information with an NFC reader located on the user variable display device 108. The user mobile device 102 may transmit an identifier (e.g., an encrypted device token) identifying the user mobile device 102 to the user variable display device 108 which, in turn, transmits the identifier to the provider institution computing system 106. As an encrypted device token, the provider institution computing system 106 may have a decryption key to decrypt the device token to reveal the device identifier. The device identifier may then be searched in the provider institution computing system 106. The user variable display device 108 may further transmit the variable display device identifier of the user variable display device 108 to the provider institution computing system 106. In this sense, the provider institution computing system may compare the identifier (at this point, the decrypted device token) regarding the user mobile device 102 to identifying information regarding the user mobile device 102 stored in the accounts database 162 of the provider institution computing system 106. Beneficially, the use of the device identifier identifying the user mobile device 102 adds security to the authentication process. As stated above, by matching the two variable display device identifiers, the provider institution computing system 106 may confirm that the device (the user variable display device 108) that communicated with the user mobile device 102 to initiate the authentication process is the same device that completed the authentication process via tapping the user mobile device 102 to the user variable display device 108, thus confirming the security of the authentication process described herein (e.g., no foreign devices were used to complete the OTP exchange).

It should be appreciated that processes 212-217 (e.g., authenticating the user of the user variable display device 108 based on possessing the user mobile device 102) may serve as another factor of authentication, or an alternative factor of authentication, for processes 207-211 (e.g., authenticating the user of the user variable display device 108 based on authentication information).

At process 218, in response to the reception of the authentication decision from the provider institution computing system 106, the variable display device interface 125 transmits a mobile device full-stage authorization signal to the user variable display device 108. The mobile device full-stage authorization signal authorizes a client application full-stage function of the AR/VR provider institution client application 185. In some embodiments, the mobile device full-stage authorization signal includes display data regarding a client application home screen (e.g., various account management and/or transaction options that may otherwise only be displayed by the provider institution client application 124). The display data may be stored by the user variable display device 108 in the memory 176 and/or transmitted by the user mobile device 102 to the user variable display device 108 for display via wireless communication (e.g., Bluetooth, Wi-Fi, and so on). Upon receiving the mobile device full-stage authorization signal from the user mobile device 102 at process 219, the user variable display device 108 initiates the client application full-stage function of the AR/VR provider institution client application 185, which allows the synchronization logic 186 to communicate with the variable display device interface 125 in order to access the full or nearly the full functionality of the provider institution client application 124 for executing an AR/VR-enabled client account transaction as described in greater detail below with reference to FIG. 3.

Figure 3:
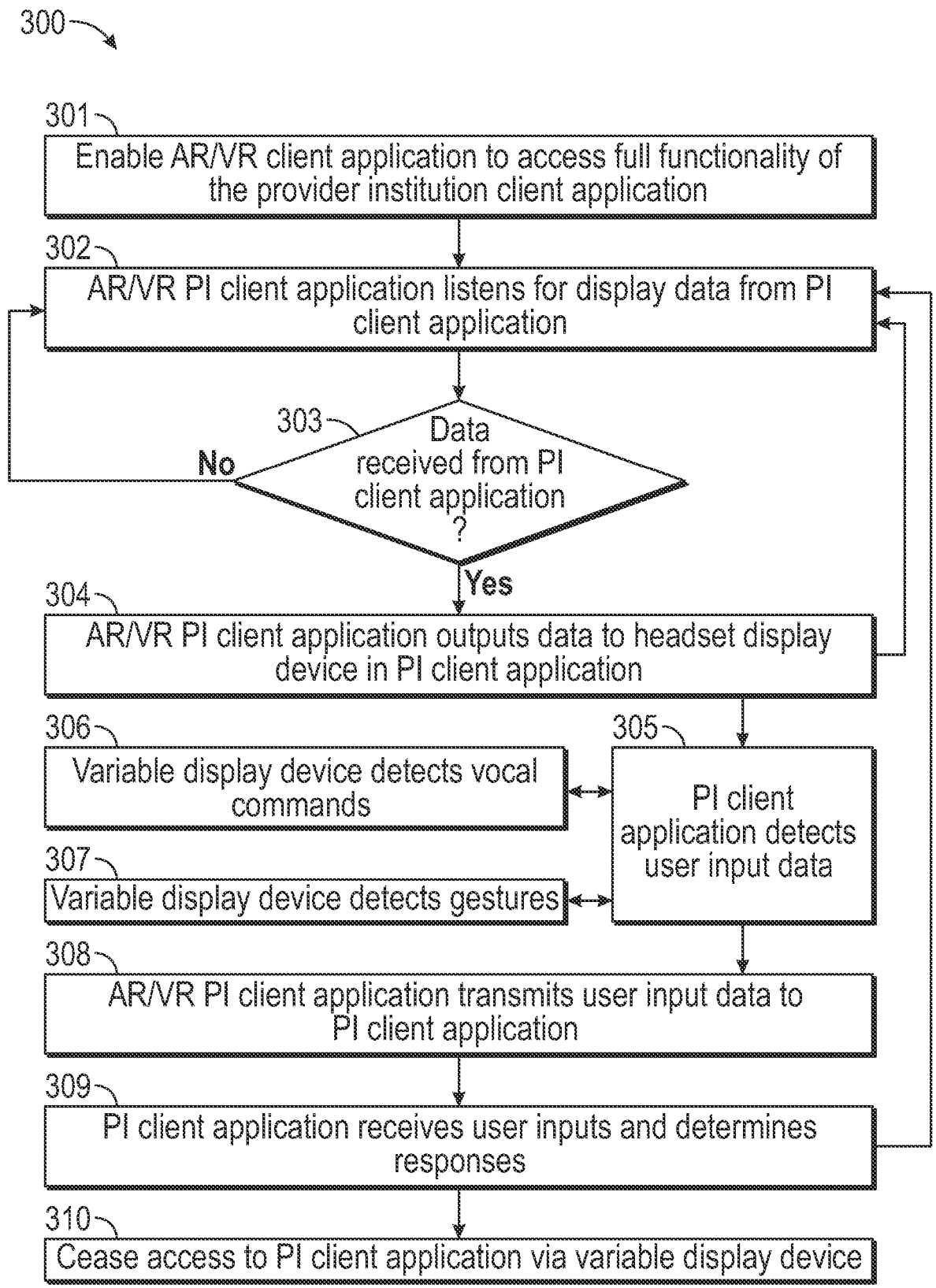
FIG. 3 is a flow diagram of a method for synchronizing various functions of a client account application of the mobile device of FIG. 1 with various functions of the variable display device of FIG. 1, according to an example embodiment.

Referring now to FIG. 3, a process 300 for synching the AR/VR environments provided by the user variable display device 108 to the corresponding operation of the provider institution client application 124 is shown, according to an example embodiment. In this regard, because method 300 may be implemented with the system 100 shown in FIG. 1 as enabled and/or initialized by the method 200 of FIG. 2, reference may be made to one or more components of FIG. 1 or processes of FIG. 2 in explaining method 300. As described in processes 301-310 below, the user variable display device 108 may substantially control the operation of the provider institution client application 124 to execute an AR/VR-enabled client account transaction.

At process 301, the client application full-stage function of the AR/VR provider institution client application 185 is authorized, thus providing the synchronization logic 186 access to the full functionality of the provider institution client application 124 (via communication with the variable display device interface 125 as described above with reference to FIG. 2 at process 219). The synchronization logic 186 may access the memory 176 of the user variable display device 108 for display data received from the variable display device interface 125 of the provider institution client application 124, provide the display data to the GPU 184 for the generation of a corresponding AR/VR environment, and facilitate the display of the AR/VR environment via the display device 182. For example, with reference to process 219 of FIG. 2, the initial operation of the full-stage function of the AR/VR provider institution client application 185 may coincide with the transmission of display data regarding a client application home screen to the user variable display device 108 from the variable display device interface 125. Thus, process 301 may conclude with the display of a client application home screen AR/VR environment via the display device 182.

At process 302, the AR/VR provider institution client application 185 "listens" (or, monitors) for data from the provider institution client application 124. In one embodiment, the synchronization logic 186, so long as the AR/VR provider institution client application 185 is running the client application full-stage function, awaits transmissions of display data from the variable display device interface 125. Accordingly, the method 300 proceeds to process 303, where the AR/VR provider institution client application 185 determines whether display data has been received from the provider institution client application 124. The AR/VR provider institution client application 185 may monitor the network interface circuit 170 of the user variable display device 108 for data packages received from the user mobile device 102 and parse the data package for display data. If no display data has been received, the method 300 returns to process 302 to continue listening for data from the provider institution client application 124. As such, while no data is being received from the provider institution client application 124, the AR/VR provider institution client application 185 remains in an idle state without requiring updates to the function of the other components within the user variable display device 108. In some embodiments, the AR/VR provider institution client application 185 may further determine whether display data that has been received is different than that which is presently stored in the memory 176 (different than the display data regarding the client application home screen used in process 301, for example). If the display data is not different, the synchronization circuit may operate the same as if no display data had in fact been received (e.g., does not replace the display data presently stored in the memory 176 with the new display data, does not update the function of the other components of the user variable display device 108, etc.). Otherwise, if data has been received, the method 300 continues to process 304, where the AR/VR provider institution client application 185 receives the display data from the provider institution client application 124, replaces the display data previously stored in the memory 176 with the new display data received, and manages the components of the user variable display device 108 in order to generate an AR/VR environment corresponding to the new display data for display on the display device 182 for the user.

As an example regarding the provision of new display data upon transmission of the mobile device full-stage authorization signal (as described with reference to process 219 of FIG. 2 above), the variable display device interface 125 begins accessing the provider institution client application 124 and extracting display data associated with the provider institution client application 124. The provider institution client application 124 may thus use the variable display device interface 125 to transmit the extracted display data and transmit the display data to the user variable display device 108. Upon receiving the transmission of display data from the provider institution client application 124, the AR/VR provider institution client application 185 determines that new display data has been received (and determines that the new display data is different, in some embodiments and as discussed above), stores the display data in the memory 176, and manages the components of the user variable display device 108 in order to display a corresponding AR/VR environment to the display device 182. In some embodiments, this includes parsing the new display data to determine which component of the user variable display device 108 should receive certain partitions of the data. For example, some partitions of the new display data may be audio data, in which case the synchronization circuit may transmit such audio data to a microphone included in the input/output circuit 178 (or located within the headset display device 182). As another example, some partitions of the new display data may be visual data (e.g., AR/VR environments including digital details for user selection) and thus may be transmitted to the display device 182. In other words, the synchronization logic 186 of the AR/VR provider institution client application 185 provides the new display data to the GPU 184 for generating a corresponding AR/VR environment, and provides the AR/VR environment to the display device 182 for display to the use of the user variable display device 108. Further, the GPU 184 may provide a mapping of the new display data to the generated AR/VR environment. For example, the GPU 184 may provide the synchronization logic 186 with data that correlates a digital detail located in a particular position on the generated AR/VR environment (e.g., directly in front of the user, to the right of the user, etc.) to the new display data. The AR/VR environment may be thus be associated with a mapping that relates a three-dimensional point-map (or other AR/VR data format) as used by the AR/VR provider institution client application 185 with a two-dimensional point-map (or other data format used by the provider institution client application 124). Providing such a mapping may include considerations of visual depth, expansions and/or contractions of width and height, animation, and other fields of visual data. The mapping may be generated as a table that associates a particular point on the new display data with a number of fields (three-dimensional position, motion vectors, etc.). Thus, the "mapping" as described herein refers to correlating a data objects from the provider institution client application 124 to the AR/VR environment of the AR/VR provider institution client application 185. The mapping may include adding a three-dimensional aspect to the object. For example, an icon of a bank may be transformed into a three-dimensional image of the bank. In this sense, the GPU 184 may provide the synchronization logic 186 with data that associates a particular client account application selection or option as typically utilized by the provider institution client application 124 with a corresponding digital detail generated for the AR/VR environment. Such a mapping may be used as described below at process 308.

At processes 305-307, the AR/VR provider institution client application 185 receives user input data (e.g., via the vocal capture electronics 180, the gesture capture electronics 179, a combination thereof, another means, etc.). For example, a user may view the AR/VR environment generated at process 304 and make corresponding selections, which are then detected by the vocal capture electronics 180 and/or the gesture capture electronics 179. For example, the user variable display device 108 may detect a selection of a selectable object (e.g., icon, button, etc.) from the user in order to determine a desired navigation of the AR/VR client account application or an action relating to the client account. Accordingly, the user may provide a physical gesture selecting a digital object regarding a savings account or paying a bill, etc. (e.g., receive a voice or vocal command of "go to savings account" to view a balance in the savings account). As another example, the user may provide a gesture selecting transaction options to pay the balance on a credit card with another account balance. A combination of vocal and physical gestures (e.g., a vocal command of "go to savings account" in combination with a physical gesture of moving a cursor over a savings account icon) may also be received and utilized. The combination may aid security to the processes described herein.

At process 308, the inputs are collected by provider institution client application 185 as selection data and transmitted to the AR/VR provider institution client application 124. In some embodiments, the AR/VR provider institution client application 185 interprets the selections in regards to the AR/VR environment, references the mapping of the AR/VR environment provided by the GPU 184, and provides the selection data to the provider institution client application 124 in terms of the display data used to generate the AR/VR environment. For example, the AR/VR provider institution client application 185 may detect user input as discussed above, such as an option to pay a bill. The user would then be enabled to provide input regarding from which account (e.g., savings account, checking account, etc.) to pay and the payee (e.g., ABC electric company). The AR/VR provider institution client application 185 may package the various inputs (e.g., selections of the "bill pay" option, the account, the payee, etc.) and transmit the previously received display data as augmented (or amended) by the selection data, thereby including various selections in various input fields presented by the display data for processing by the provider institution client application 124. In other embodiments, such user selections are transmitted one at a time and receive corresponding responses from the provider institution client application in-step. Thus, at process 309, the variable display device interface 125 may receive the selection data and apply the selection data to the provider institution client application 124 in a format that the provider institution client application 124 is configured to interpret (e.g., in response to manual operation of the provider institution client application 124 via the user mobile device 102). In other words, the synchronization logic 186 may provide the provider institution client application 124 with the display data previously provided by the provider institution client application 124, now with selection data augmenting the display data (e.g., a partition of the display data associated with an option to view an account balance has now been augmented with data indicating that said option was selected).

At process 307, the provider institution client application 124 of the user mobile device 102 receives the display data augmented with selection data from the AR/VR provider institution client application 185 of the user variable display device 108. In turn the provider institution client application 124 interprets the display data and selection data and determines a response. In some embodiments, this may include various transmissions to the provider institution computing system 106 and/or receiving corresponding responses from the provider institution computing system 106. The method 300 may return to process 302 where the AR/VR provider institution client application 185 continues listening for display data from the provider institution client application 124.

Based on the determined response, the provider institution client application 124 may transmit new display data to provider institution client application 185 (in which case process 303 as continuously completed after process 302 determines that the method 300 continues with process 304 as discussed above). In some embodiments, however, the display data and selection data may indicate the closure of the client account application (e.g., the selection(s) have amounted to the completion of a client account management option or transaction, or an otherwise closure of the client account application). In this case, the method 300 proceeds to process 308, where the provider institution client application 124 transmits a closure message to the synchronization circuit indicating that the client application full-stage function of the AR/VR provider institution client application 185 is no longer authorized, and thus the full functionality of the provider institution client application 124 is no longer accessible via the user variable display device 108. The closure message may include display data indicating as such. In such cases, the cyclical communication between the variable the provider institution client application 124 and the synchronization logic 186 may end, such that the provider institution client application 124 is no longer displayed on the user variable display device 108 or controlled by the user inputs detected by the user variable display device 108.

As described above, the AR/VR provider institution client application 185 may transmit instructions, commands, etc. received from the user wirelessly to the provider institution client application 124 of the user mobile device 102. The provider institution client application 124 may process the information and provide various responses (e.g., retrieve requested account balances, update bill pay information, show account details such as address on the account, show mortgage information, etc.). If the information is not saved local in the user mobile device 102, the provider institution client application 124 may communicate with the provider institution computing system 106 to receive requested information and/or to execute various transactions. Thus, the AR/VR provider institution client application 185 controls the provider institution client application 124 of the user mobile device 102 to effectuate one or more client transactions. In another embodiment and subsequent to authorization and authentication, the AR/VR provider institution client application 185 may communicate directly with the provider institution computing system 106 to enable client account transactions (e.g., view account balances, change/view bill pay information, set up funds transfers, turn associated cards on/off, report associated cards lost, stolen, or misplaced, and so on). In this latter configuration, client account transaction processing times via the AR/VR provider institution client application 185 may be relatively faster due to not going through an intermediary in some situations (i.e., the user mobile device 102). However, a wide area network connection may be required. In the former embodiment, a short-range wireless connection may be required (e.g., Bluetooth, LAN, etc.) that enables the transmission of data and, so long as the data is stored locally, client account transactions may accomplished without communicating with the provider institution computing system 106. Moreover and in this former embodiment, an added layer of security may be realized because the user mobile device 102 may be required to be within a certain distance of the user variable display device 108 in order to enable data communications between the devices. If the devices are separated by more than a predefined amount of distance (e.g., a set distance such as twenty feet or a distance prescribed a short-range wireless communication protocol, such as Bluetooth, NFC, or a LAN), then the session ends and client account transactions are prevented.

Figure 4A:
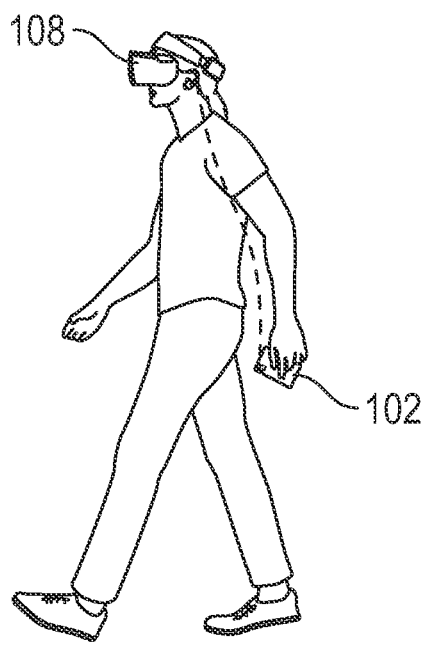
FIG. 4A is an example illustration of a user conducting a user action via the variable display device and user mobile device of FIG. 1, according to an example embodiment.

Referring now to FIG. 4A, an illustration of a user using the user variable display device 108 is shown, according to an example embodiment. As shown, the user may wear the user variable display device 108 on their head, which may communicate with the user mobile device 102 as described herein.

Figure 4B:
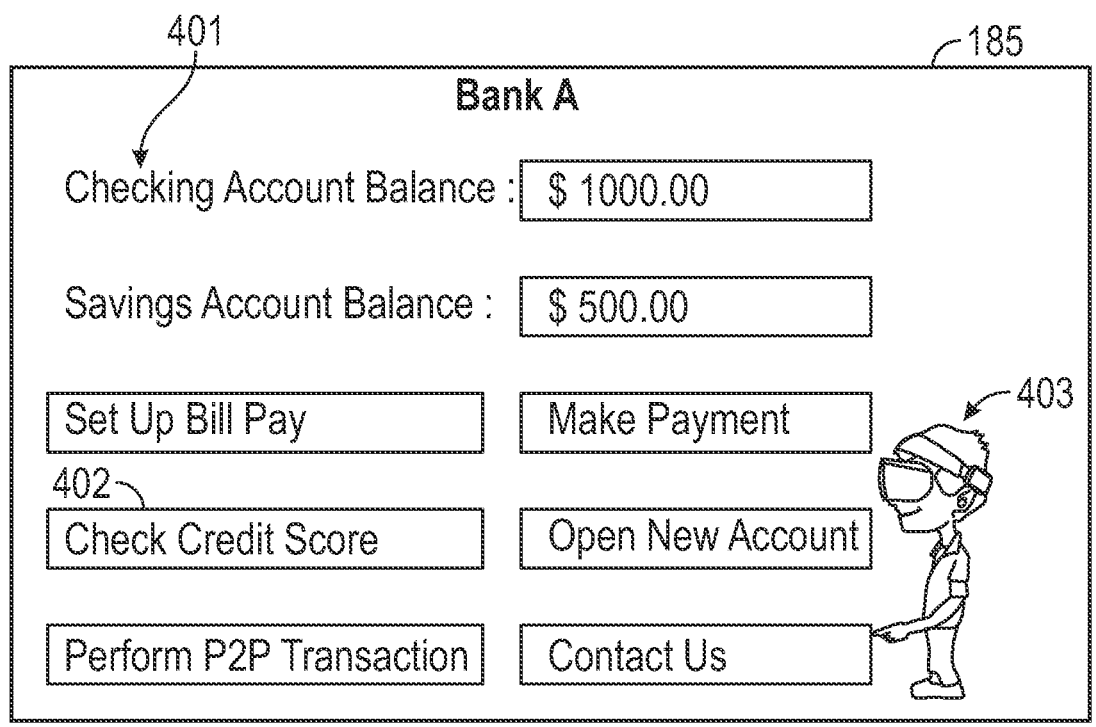
FIG. 4B is a user interface displayed by the variable display device of FIG. 1 for usage with the client account application, according to an example embodiment.

Referring now to FIG. 4B, an example display generated by the AR/VR provider institution client application 185 is shown, according to an example embodiment. As shown, the AR/VR provider institution client application 185 may present the user with a display that includes various account information fields 401, account options 402, and an avatar 403 generated to provide comments, hints, and prompt the user to provide requests or questions that the user variable display device 108 may detect and process.

As an example of operation, the user depicted in FIG. 4A may place the user variable display device 108 on their head and launch the AR/VR provider institution client application 185. The user may then be prompted for user authentication information. As an example, the user may authenticate themselves by tapping a transaction card to the user variable display device 108. As another example, the user may authenticate themselves by tapping the user mobile device 102 to the user variable display device 108. As yet another example, the user may view an OTP transmitted to the user mobile device 102 and provide the OTP via the user variable display device 108. As still another example, the user may be authenticated via a biometric or a combination of the above. The user may then be permitted to navigate the provider institution client application 124 via the user variable display device 108 and thus view client application home screen depicted in FIG. 4B, which may be displayed in an AR/VR environment. Accordingly, the user may select any of the account options 402 and/or view the account information fields 401 using audible or gesture commands detected by the user variable display device 108. As an example, the user may transfer funds from one account to another. As another example, the user may make a mortgage payment. As yet another example, the user may pay the balance on a credit card. As another example still, the user may transfer funds from a checking account to a savings account. Throughout the use of the AR/VR provider institution client application 185, an avatar 403 may provide periodic comments or visual gestures to suggest particular actions involving the account options 402. In some cases, such comments may utilize account information associated with the user. Further, the user may address the avatar 403 and ask questions that the avatar 403 may respond to. As an example, the user may say "Avatar, how do I set up automatic payments for my utilities bill?" The avatar 403 may then provide an audible response such as "Select 'Set up bill pay,'" visually gesture to the "Set Up Bill Pay" account option, or some combination thereof. After the user has conducted one or more various desired actions, the user may close and/or log out of the AR/VR provider institution client application 185.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more suitable processors, such as application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include suitable computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A computer-implemented method, the method comprising:
    establishing, by a variable display device, a wireless connection between the variable display device and a mobile device, the mobile device comprising a client account application;
    authenticating, by the variable display device, a user of the variable display device, wherein authenticating the user comprises:
        receiving, by the variable display device, a prompt for authentication information from the mobile device in response to establishing the wireless connection;
        transmitting, by the variable display device, the authentication information to the mobile device in response to detecting a selection of authentication information; and
        receiving, by the variable display device, a notification from the mobile device comprising an indication of verification of the authentication information;
    receiving, by the variable display device, display data from the mobile device in response to the authentication of the user, wherein the display data comprises one or more input fields associated with the client account application;
    displaying, by the variable display device, a visual environment based on the display data;
    detecting, by the variable display device, a selection of one or more input fields associated with the client account application within the visual environments; and
    causing, by the variable display device, execution of the selection by transmitting the selection to the mobile device.

2. The computer-implemented method of claim 1, wherein the visual environment is one of an augmented reality environment or a virtual reality environment, and wherein detecting the selection of the one or more input fields includes detecting at least one of a physical gesture or a vocal command.

3. The computer-implemented method of claim 1, wherein authenticating the user further comprises:
    receiving, by the variable display device, a prompt for a one-time-passcode (OTP);
    receiving, by the variable display device, a OTP from the user of the variable display device;
    transmitting, by the variable display device, the OTP to a provider institution computing system; and
    receiving, by the variable display device, a notification indicating a verification of the OTP by the provider institution computing system.

4. The computer-implemented method of claim 1, wherein authenticating the user of the variable display device further comprises:
    receiving, by the variable display device, an identifier associated with the mobile device via a short-range wireless communication between the variable display device and the mobile device; and
    receiving, by the variable display device, an indication that the identifier received from the short-range wireless communication matches an identifier associated with the mobile device comprising the client account application.

5. The computer-implemented method of claim 1, wherein authenticating the user of the variable display device further comprises:
    receiving, by the variable display device, information regarding a transaction card associated with a client account via a short-range wireless communication between the variable display device and the transaction card; and
    receiving, by the variable display device, an indication that the information regarding the transaction card received from the short-range wireless communication matches information regarding a transaction card associated with the client account application of the mobile device.

6. The computer-implemented method of claim 1, wherein the authentication information comprises at least one of a biometric, a personal identification number, a passcode, or a password.

7. The computer-implemented method of claim 1, further comprising:
generating, by the variable display device, a mapping of the display data to the visual environment; and
generating, by the variable display device, augmented display data, wherein the augmented display data comprise the display data and the selection, such that the selection is embedded onto the display data and is associated with the one or more input fields.

8. One or more non-transitory computer-readable media storing instructions therein that, when executed by at least one processor of a variable display device, cause operations comprising:
establishing a wireless connection between the variable display device and a mobile device, the mobile device comprising a client account application;
authenticating a user of the variable display device, wherein authenticating the user comprises:
receiving a prompt for authentication information from the mobile device in response to establishing the wireless connection,
transmitting the authentication information to the mobile device in response to detecting a selection of authentication information, and
receiving a notification from the mobile device comprising an indication of verification of the authentication information;
receiving display data from the mobile device in response to the authentication of the user, wherein the display data comprises one or more input fields associated with the client account application;
generating and displaying a visual environment based on the display data;
detecting a selection of one or more input fields associated with the client account application within the visual environment; and
causing execution of the selection by transmitting the selection to the mobile device.

9. The one or more non-transitory computer-readable media of claim 8, wherein authenticating the user further comprises:
receiving a prompt for a one-time-passcode (OTP);
receiving an OTP;
transmitting the OTP to a provider institution computing system; and
receiving a notification indicating a verification of the OTP by the provider institution computing system.

10. The one or more non-transitory computer-readable media of claim 8, wherein authenticating the user of the variable display device further includes operations comprising:
receiving an identifier associated with the mobile device via a short-range wireless communication between the variable display device and the mobile device; and
receiving an indication that the identifier received from the short-range wireless communication matches an identifier associated with the mobile device comprising the client account application.

11. The one or more non-transitory computer-readable media of claim 8, wherein authenticating the user of the variable display device further includes operations comprising:
receiving information regarding a transaction card associated with a client account via a short-range wireless communication between the variable display device and the transaction card; and
receiving an indication that the information regarding the transaction card received from the short-range wireless communication matches information regarding a transaction card associated with the client account application of the mobile device.

12. The one or more non-transitory computer-readable media of claim 8, wherein the authentication information comprises at least one of a biometric, a personal identification number, a passcode, or a password.

13. The one or more non-transitory computer-readable media of claim 8, wherein the instructions further cause operations comprising:
generating a mapping of the display data to the visual environment; and
generating augmented display data comprising the display data and the selection, wherein the selection is included with the display data and is associated with the one or more input fields.

14. The one or more non-transitory computer-readable media of claim 8, wherein the visual environment is one of an augmented reality environment or a virtual reality environment.

15. A system comprising:
a processor; and
a memory coupled to the processor, the memory having instructions stored thereon that when executed by the processor, cause the processor to:
establish a wireless connection with a mobile device comprising a client account application;
authenticate a user;
receive display data from the mobile device in response to the authentication of the user, wherein the display data comprises one or more input fields associated with the client account application;
generate and display a visual environment based on the display data, wherein the visual environment is one of an augmented reality environment or a virtual reality environment;
detect a selection of one or more input fields associated with the client account application within the visual environment; and
cause execution of the selection by transmitting the selection to the mobile device.

16. The system of claim 15, wherein in authenticating the user, the instructions cause the processor to:
receive a prompt for authentication information from the mobile device in response to establishing the wireless connection;
transmit the authentication information to the mobile device, and
receive a notification from the mobile device comprising an indication of verification of the authentication information.

17. The system of claim 16, wherein in authenticating the user, the instructions further cause the processor to:
receive an identifier associated with the mobile device via a short-range wireless communication with the mobile device, and
receive an indication that the identifier received from the short-range wireless communication matches an identifier associated with the mobile device.

18. The system of claim 16, wherein in authenticating the user, the instructions further cause the processor to:

receive information regarding a transaction card associated with a client account via a short-range wireless communication with the transaction card, and receive an indication that the information regarding the transaction card received from the short-range wireless communication matches information regarding a transaction card associated with the client account application of the mobile device.

19. The system of claim 16, wherein in authenticating the user, the instructions further cause the processor to:

receive a prompt for a one-time-passcode (OTP);

receive an OTP;

transmit the received OTP to a provider institution computing system; and receive a notification indicating a verification of the OTP by the provider institution computing system.

20. The system of claim 15, wherein the instructions further cause the processor to:

generate a mapping of the display data to the visual environment; and generate augmented display data comprising the display data and the selection, wherein the selection is included with the display data and is associated with the one or more input fields.

\* \* \* \* \*